(12) United States Patent
Brown (10) Patent No.: US 9,750,201 B2
(45) Date of Patent: Sep. 5, 2017

(54) EXPANDABLE TREE PROTECTION DEVICE

(71) Applicant: William A. Brown, Akron, IA (US)

(72) Inventor: William A. Brown, Akron, IA (US)

(*) Notice: Subject to any disclaimer, the term of this patent is extended or adjusted under 35 U.S.C. 154(b) by 183 days.

(21) Appl. No.: 14/535,409

(22) Filed: Nov. 7, 2014

(65) Prior Publication Data

US 2016/0128283 A1    May 12, 2016

(51) Int. Cl.
*A01G 13/02* (2006.01)

(52) U.S. Cl.
CPC .................................. *A01G 13/0281* (2013.01)

(58) Field of Classification Search
CPC .................... A01G 13/0237; A01G 13/0281
USPC ..................................................... 47/32.4, 32
See application file for complete search history.

(56) References Cited

U.S. PATENT DOCUMENTS

| | | | | |
|---|---|---|---|---|
| 1,989,952 A * | 2/1935 | Thomas | ................. | A47G 7/07 47/41.13 |
| 2,478,278 A * | 8/1949 | Lothar | ................. | A47G 33/1213 248/524 |
| 3,141,263 A * | 7/1964 | Wang | ................. | A01G 31/02 206/423 |
| 3,946,522 A * | 3/1976 | Schifman | ................. | A01G 9/02 47/40 |
| 4,348,831 A | 9/1982 | Chambers | | |
| 4,712,329 A * | 12/1987 | Anderson | ................. | A01G 9/02 47/84 |
| 4,735,014 A * | 4/1988 | Weber | ................. | A01G 1/042 47/1.1 |
| 4,884,363 A | 12/1989 | Sofy | | |
| 4,977,703 A * | 12/1990 | Blanc | ................. | A01G 13/0281 47/30 |
| 4,984,384 A * | 1/1991 | Kaufmann | ................. | E02D 17/202 405/15 |
| 5,062,388 A * | 11/1991 | Kilham | ................. | A01K 39/012 119/52.2 |
| 5,117,582 A * | 6/1992 | Cissel, Jr. | ................. | A01G 23/04 47/21.1 |
| 5,168,678 A * | 12/1992 | Scott, Jr. | ................. | A01G 1/08 47/33 |
| 5,279,069 A * | 1/1994 | Myer | ................. | A01G 13/0281 47/32 |
| 5,287,654 A * | 2/1994 | Davlantes | ................. | A01K 1/035 47/56 |
| 5,548,923 A * | 8/1996 | Myer | ................. | A01G 13/0281 47/32 |

(Continued)

FOREIGN PATENT DOCUMENTS

WO    WO2006038969    4/2006

*Primary Examiner* — Marc Burgess
*Assistant Examiner* — Morgan T Barlow (57) ABSTRACT

An expandable tree protection device covers an area surrounding a tree trunk and provides for expansion to accommodate growth of the tree trunk over time. The device includes a tray comprising a top wall and a perimeter wall coupled to and extending around a peripheral edge of the top wall. The tray has an aperture extending through the top wall for receiving a tree trunk therethrough. Each of a plurality of panels is slidably coupled to the top wall extend into the aperture covering an associated portion of the aperture. A respective interior edge of each panel is slidable outwardly away from a center of the aperture for expansion exposing a larger area of the aperture as the tree trunk grows.

12 Claims, 7 Drawing Sheets

(56) References Cited

U.S. PATENT DOCUMENTS

| | | | | |
|---|---|---|---|---|
| 5,711,106 A * | 1/1998 | Ellis | A01G 13/0281 | 47/30 |
| 5,839,222 A * | 11/1998 | Sittner | A01G 13/0281 | 47/21.1 |
| 5,848,522 A * | 12/1998 | Coviello, Jr. | A01D 46/26 | 47/32.4 |
| 5,878,528 A | 3/1999 | Pattyn | | |
| 5,918,849 A * | 7/1999 | Bliss | A47G 33/1213 | 192/223.1 |
| 6,019,341 A * | 2/2000 | Brown | A47G 33/1213 | 248/516 |
| 6,141,927 A * | 11/2000 | Usui | E01C 9/08 | 403/170 |
| 6,182,394 B1 | 2/2001 | Bassler | | |
| 6,357,173 B1 | 3/2002 | Sofy et al. | | |
| 6,370,816 B1 | 4/2002 | Rosato | | |
| 6,536,158 B2 * | 3/2003 | Rice | A01G 13/0281 | 47/32.4 |
| 6,540,194 B2 * | 4/2003 | Schmitt | A47G 33/1213 | 248/511 |
| 6,877,274 B2 | 4/2005 | Fiveash | | |
| 7,013,597 B1 * | 3/2006 | Dominguez | A01G 13/0212 | 47/31.1 |
| 7,160,054 B2 * | 1/2007 | Smiley | A01G 13/0281 | 404/35 |
| 7,600,342 B2 * | 10/2009 | Fiveash | A47G 33/12 | 47/40.5 |
| 8,091,853 B2 * | 1/2012 | Clores | A47G 33/12 | 248/523 |
| 8,201,519 B2 * | 6/2012 | Humphries | A01K 39/0206 | 119/51.01 |
| 8,567,123 B2 | 10/2013 | Friesen | | |
| 2008/0256855 A1 * | 10/2008 | Helmy | A01G 13/0281 | 47/33 |
| 2010/0313471 A1 | 12/2010 | Middaugh | | |
| 2011/0047871 A1 | 3/2011 | Bowerman | | |
| 2011/0214346 A1 * | 9/2011 | Linton | A01G 1/00 | 47/48.5 |
| 2011/0259393 A1 * | 10/2011 | Lai | H02S 30/20 | 136/245 |
| 2011/0265378 A1 * | 11/2011 | Callaway | A01G 9/243 | 47/1.01 R |
| 2011/0308152 A1 * | 12/2011 | Harley | A01G 25/00 | 47/48.5 |
| 2012/0227316 A1 | 9/2012 | Ptak | | |

* cited by examiner

FIG. 1

FIG. 2
(Exploded View)

FIG. 3

FIG. 4
(Top View)

FIG. 5
(Side View)

FIG. 6
(In-use View)

FIG. 8

EXPANDABLE TREE PROTECTION DEVICE

BACKGROUND OF THE DISCLOSURE

Field of the Disclosure

The disclosure relates to tree protection devices and more particularly pertains to a new tree protection device for covering an area surrounding a tree trunk and providing expansion to accommodate growth of the tree trunk over time.

SUMMARY OF THE DISCLOSURE

An embodiment of the disclosure meets the needs presented above by generally comprising a tray comprising a top wall and a perimeter wall coupled to and extending around a peripheral edge of the top wall. The tray has an aperture extending through the top wall for receiving a tree trunk therethrough. Each of a plurality of panels is slidably coupled to the top wall extend into the aperture covering an associated portion of the aperture. A respective interior edge of each panel is slidable outwardly away from a center of the aperture for expansion exposing a larger area of the aperture as the tree trunk grows.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF THE DRAWINGS

The disclosure will be better understood and objects other than those set forth above will become apparent when consideration is given to the following detailed description thereof. Such description makes reference to the annexed drawings wherein.

DESCRIPTION OF THE PREFERRED EMBODIMENT

With reference now to the drawings, and in particular to FIGS. 1 through 8 thereof, a new tree protection device embodying the principles and concepts of an embodiment of the disclosure and generally designated by the reference numeral 10 will be described.

Figure 1:
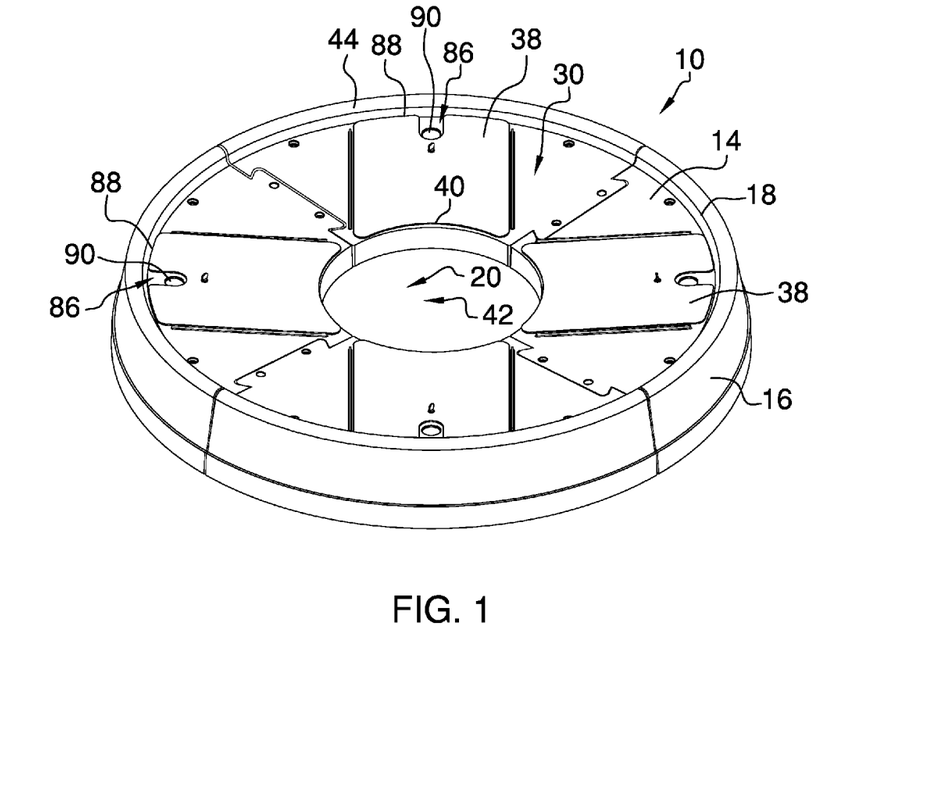
FIG. 1 is a top front side perspective view of an expandable tree protection device according to an embodiment of the disclosure.
Figure 2:
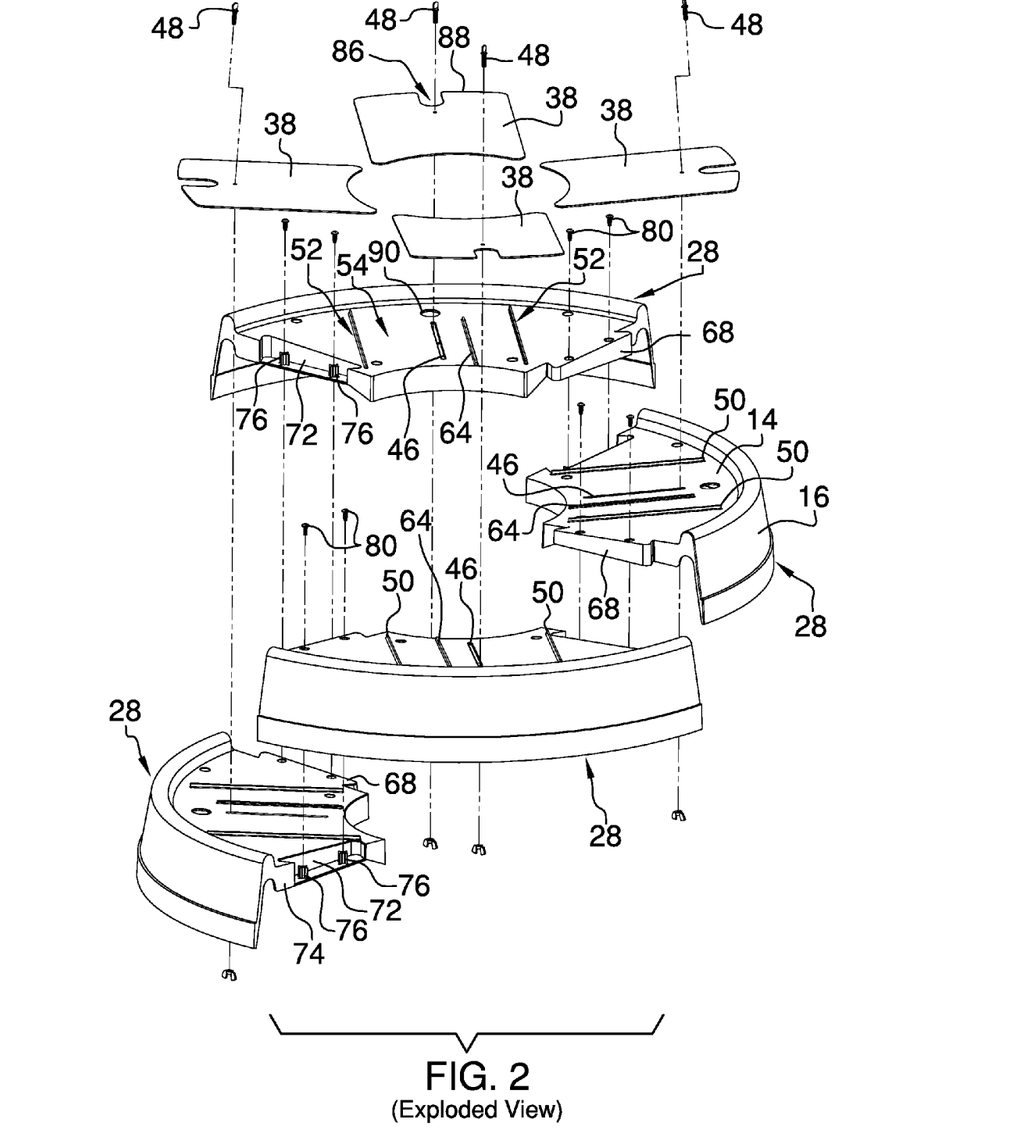
FIG. 2 is an exploded top front side perspective view of an embodiment of the disclosure.
Figure 3:
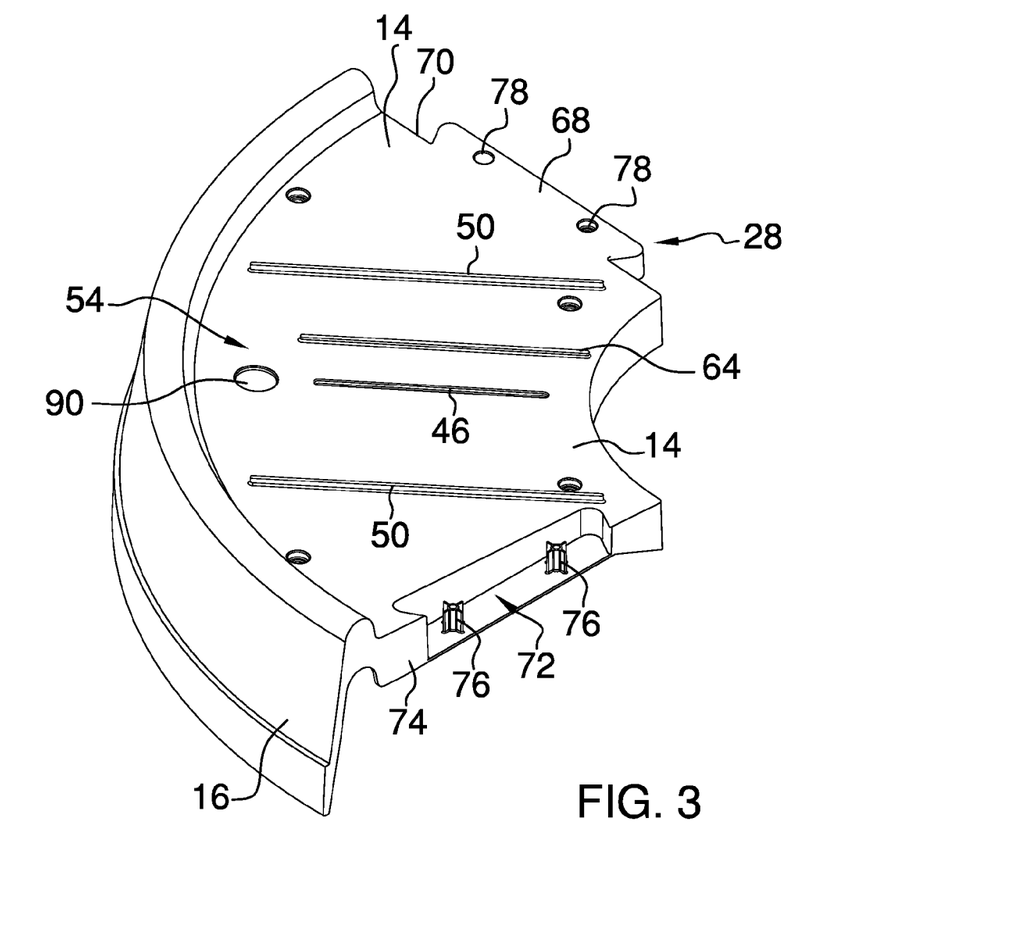
FIG. 3 is a top front side perspective view of a tray segment of an embodiment of the disclosure.
Figure 4:
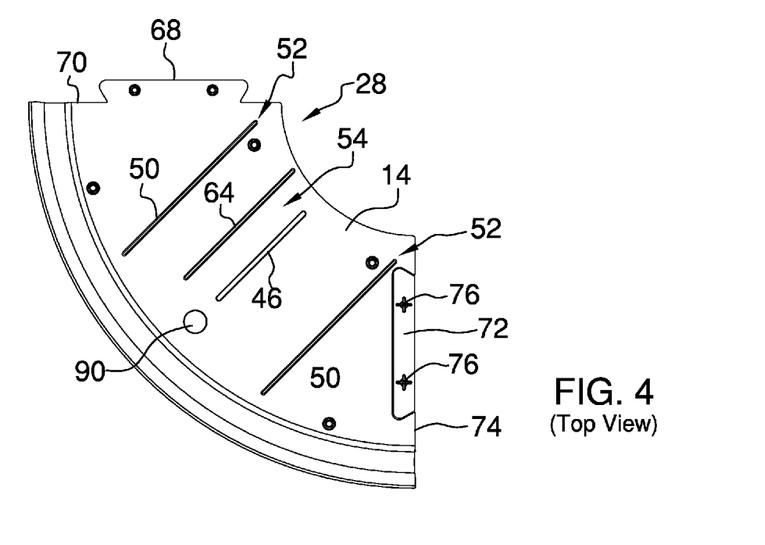
FIG. 4 is a top view of a tray segment of an embodiment of the disclosure.
Figure 5:
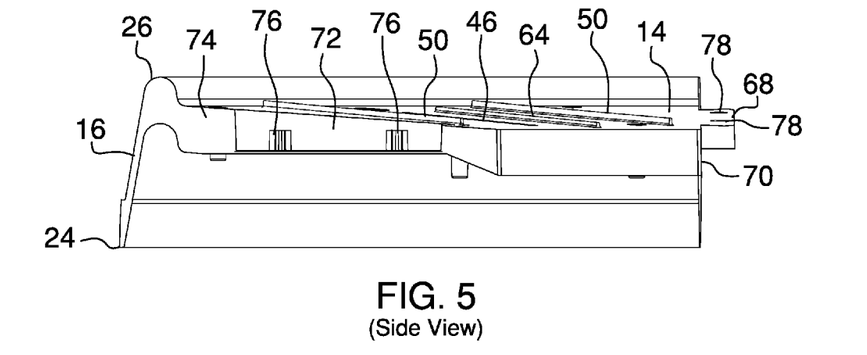
FIG. 5 is a side view of an embodiment of the disclosure.
Figure 6:
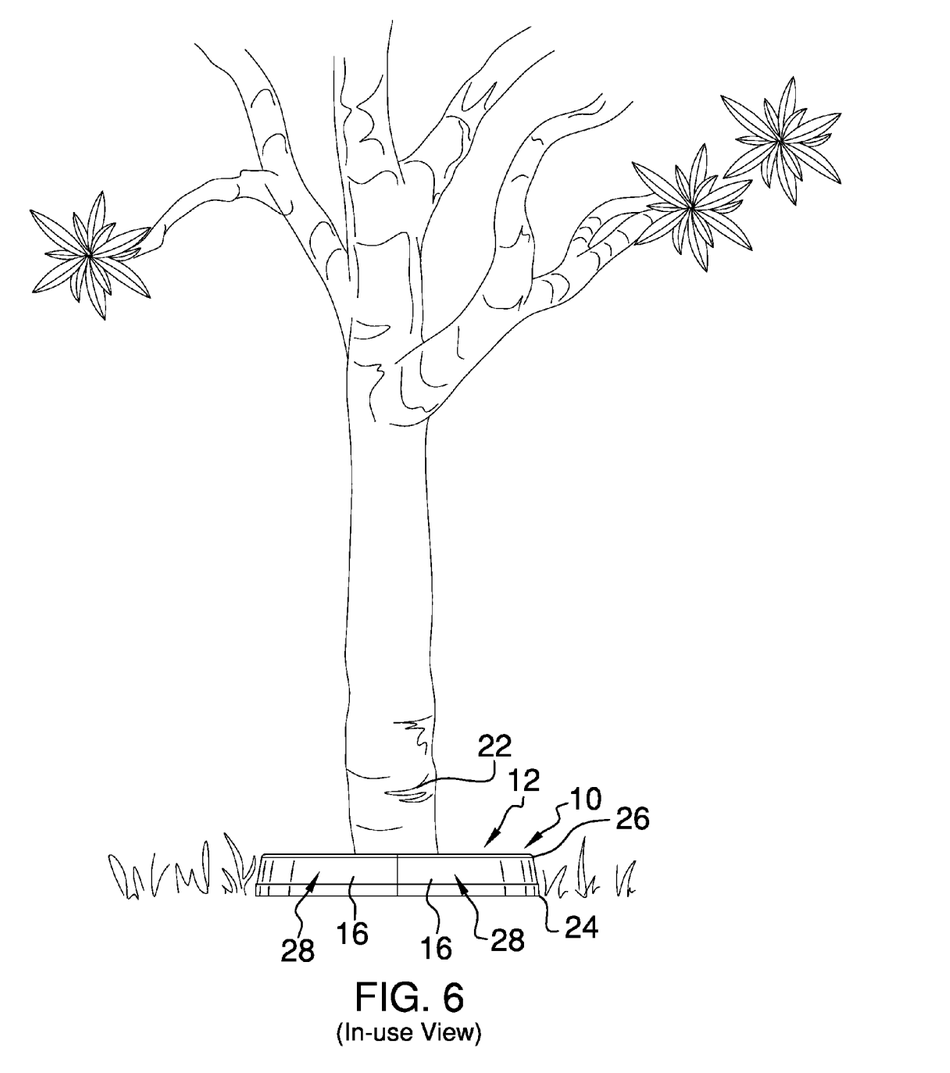
FIG. 6 is a front view of an embodiment of the disclosure in use.
Figure 7:
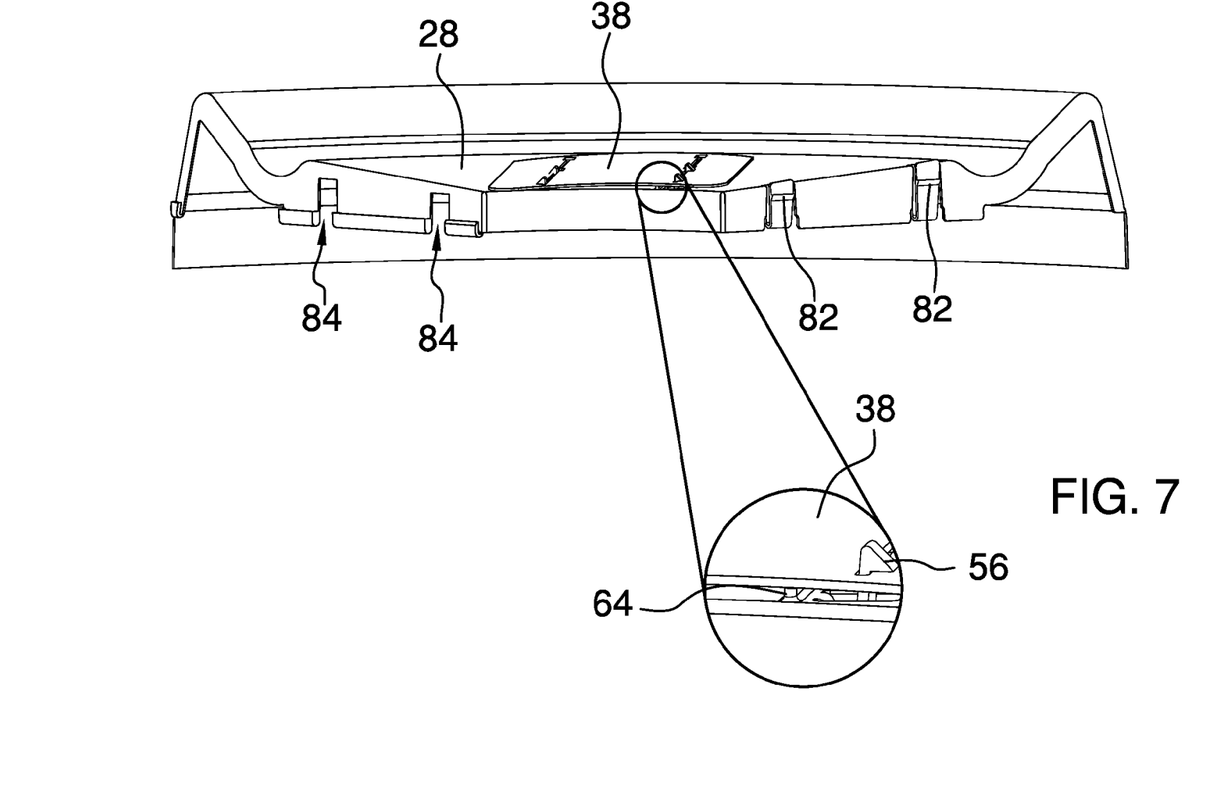
FIG. 7 is a top front side perspective and detailed view of a tray segment demonstrating alternative elements of an embodiment of the disclosure.
Figure 8:
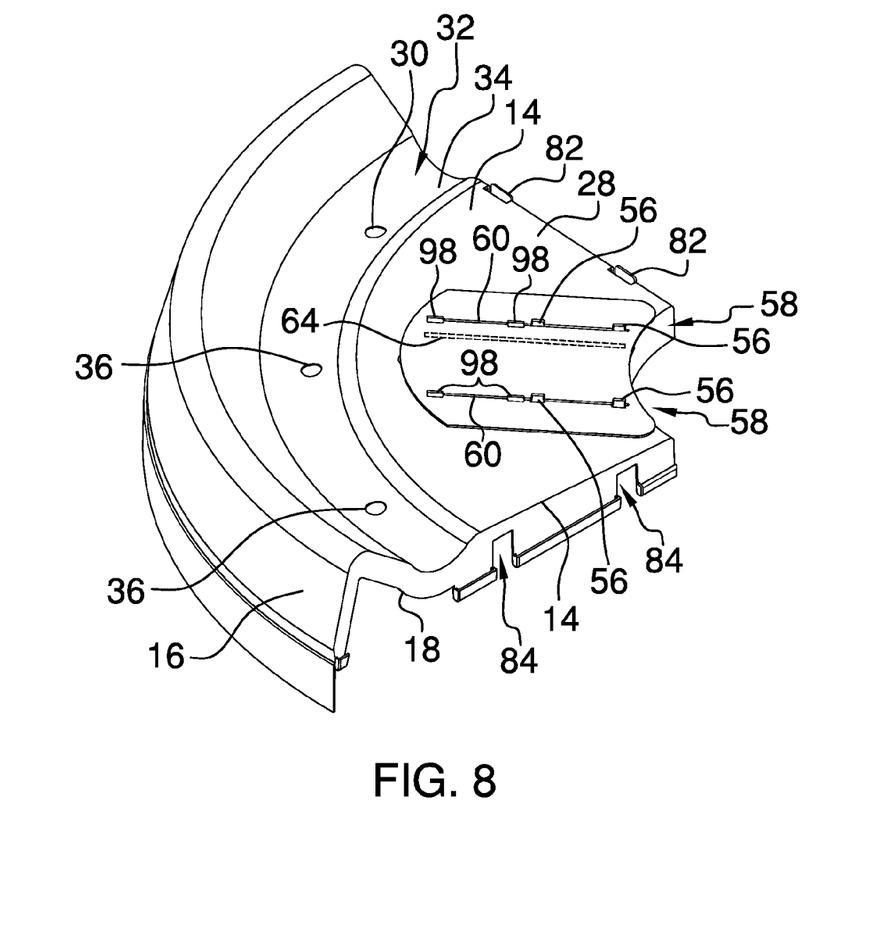
FIG. 8 is top back side perspective view of the tray segment as shown in FIG. 7.

As best illustrated in FIGS. 1 through 8, the expandable tree protection device 10 generally comprises a tray 12 comprising a top wall 14 and a perimeter wall 16 coupled to and extending around a peripheral edge 18 of the top wall 14. The tray 12 has an aperture extending 20 through the top wall 14 such that the aperture 20 is configured for receiving a tree trunk 22 therethrough. The tray 12 is circular and the aperture 20 is centrally positioned in the top wall 14. The perimeter wall 16 is angled relative to the top wall 14 such that a lowermost edge 24 of the perimeter wall 16 is outwardly positioned relative to an uppermost edge 26 of the perimeter wall 16. This allows trimming of grass or weeds using a conventional lawn mowing device as the angling allows for positioning of the lawn mower blade to overlap the lowermost edge 26 of the perimeter wall 16. The tray 12 is defined by a plurality of separate tray segments 28. Each tray segment 28 is couplable to an associated pair of adjacently positioned tray segments 28 to form a ring around the tree trunk 22. The top wall 14 includes a slanted section 30. The slanted section 30 is slanted downwardly extending inwardly away from the peripheral edge 18 of the top wall 14 towards the aperture 20. As shown if FIGS. 1 through 6, the slanted section 30 may comprise the entirety of the top wall 14, particularly in smaller diameters of the device 10. Where desired, as seen in FIGS. 7 and 8, an outer portion 32 of the top wall 14 adjacent to the peripheral edge 18 defines a depression 34 positioned in the top wall 14. Each of a plurality of drains 36 extends through the top wall 14 positioned in the depression 34 facilitating passage of water through the top wall 14 in spaced relationship to the aperture 20. This facilitates more even distribution of water under the tray 12 in larger diameter embodiments of the device 10.

Each of a plurality of panels 38 is slidably coupled to the top wall 14 such that each panel 38 is slidable to extend into or overhanging the aperture 20 such that each panel 38 covers an associated portion of the aperture 20. Each panel 38 may slide inwardly until a curved interior edge 40 of the panel 38 abuts the tree trunk 22. Each respective interior edge 40 of each panel 38 is slidable outwardly away from a center 42 of the aperture 20 wherein the panels 38 are configured for expansion exposing a larger area of the aperture 20 allowing the device 10 to be used continuously as the tree trunk 22 grows in diameter. Each panel 38 is coupled to an associated one of the tray segments 28. A lip 44 is coupled to and extends upwardly relative to the peripheral edge 18 of the top wall 14 wherein the lip 44 is configured for inhibiting material on the top wall 14 from moving laterally off of the top wall 14 over the peripheral edge 18 of the top wall 14. A respective notch 86 may extend into a distal edge 88 of each panel 38 relative to said aperture 20. Each notch 86 may align with an associated opening 90 extending through the top wall 14 to allow air flow and water to pass through the top wall 14 proximate the peripheral edge 18 of the top wall 14 even when the panels 38 are fully extended away from the aperture 20.

The panels 38 may be coupled to the tray 12 in different ways. As shown in FIGS. 1 through 6, a plurality of slots 46 extend through the top wall 14 of the tray 12. Each of a plurality of pegs 48 is coupled to and extends from an associated one of the panels 38. Each peg 48 is positioned in and slidable in an associated one of the slots 46. The pegs 48 may be defined by a shaft of a screw or the like secured by a wing nut tightened sufficiently to secure the panel 38 but loose enough to permit the desired sliding of the panel 38 relative to the top wall 14. Each of a plurality of rails 50 is coupled to the tray 12. The rails 50 are arranged into parallel pairs 52 defining a track 54 extending radially from the aperture 20. Each of the panels 38 is positioned in an associated one of the tracks 54 between the rails 50 to maintain radial orientation of the panels 38.

Alternatively, as shown in FIGS. 7 and 8, each of a plurality of prongs 56 is coupled to an associated one of the tray segments 28 extending upwardly from the top wall 14. The prongs 56 are arranged into two parallel pairs 58 of linearly aligned prongs 56. The two parallel pairs 58 of linearly aligned prongs 56 are radially oriented relative to the aperture 20. Each panel 38 has a pair of parallel slits 60. Each pair of linearly aligned prongs 56 is insertable through respective wide sections 98 into an associated one of the slits 60 wherein the panels 38 are slidably engaged to the tray 12 and substantially held in proper alignment by the spacing of the linearly aligned prongs 56.

A single support 64 may be provided under each panel 38 offset from a center of the panel 38 when the panel 38 is coupled to the tray segment 28 to tilt the panel 38 in a manner facilitating overlapping of adjacent panels 38 when the device 10 is fully assembled.

The tray segments 28 may be coupled together in the following manners. As shown in FIGS. 1 through 6, each tray segment 28 has a tongue 68 extending from a first lateral side 70 and a groove 72 extending into a second lateral side 74. The tongue 68 of each tray segment 28 is insertable into the groove 72 of one of the adjacently positioned tray segments 28. The groove 72 of each tray segment 28 receives the tongue 68 of one of the adjacently positioned tray segments 28. Thus, the tray segments 28 are interlocked to form the tray 12. Each tongue 68 is substantially tetrahedral flaring outwardly extending away from the first lateral side 70 of the associated tray segment 28 and the grooves 74 are complementary in shape. A respective pair of posts 76 is positioned in each groove 72. A respective pair of holes 78 extends through each tongue 68. Each pair of holes 78 is complementary to the pair of posts 76 wherein each post 76 is inserted through an associated one of the holes 78 when each tongue 68 is inserted into the associated groove 72. Each of a plurality of connectors 80 is couplable to an associated one of the posts 76 such that the connector 80 secures the associated post 76 in the associated hole 78.

Alternatively, as shown in FIGS. 7 and 8, each of a plurality of clips 82 is coupled to an associated one of the tray segments 28. Each of a plurality of receivers 84 is coupled to an associated one of the tray segments 28. Each receiver 84 is complementary to and positioned to receive the clip 82 of an adjacently positioned one of the tray segments 28 to form the tray 12. Each tray segment 28 may form a quarter of the tray 12.

In use, the device 10 is installed around the tree trunk 22 allowing the panels 38 to extend into abutment with the tree trunk 22. The device 10 protects the ground surrounding the tree trunk 22 in the same manner as mulch or other conventional devices which assist in deterring weed growth and retention of nutrients and water at the base of the tree trunk 22. The panels 38 expand outwardly as the tree trunk 22 increases in diameter. Thus, the device 10 may be constructed of a durable material and kept in place for extended periods of time without damaging the tree trunk 22.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. An expandable tree protection device comprising:
    a tray comprising a top wall and a perimeter wall coupled to and extending around a peripheral edge of said top wall, said tray having an aperture extending through said top wall such that said aperture is configured for receiving a tree trunk therethrough;
    a plurality of panels, each of said panels being slidably coupled to said top wall such that each said panel is freely slidable to extend into said aperture such that each said panel covers an associated portion of said aperture, a respective interior edge of each said panel being freely slidable outwardly and straight away from a center of said aperture wherein said panels are configured for expansion exposing a larger area of said aperture;
    said tray comprising a plurality of tray segments, each said tray segment being couplable to an associated pair of adjacently positioned tray segments, each said tray segment having a tongue extending from a first lateral side and a groove extending into a second lateral side, said tongue of each said tray segment being insertable into said groove of one of said adjacently positioned tray segments, said groove of each said tray segment receiving said tongue of one of said adjacently positioned tray segments wherein said tray segments are interlocked to form said tray;
    a respective pair of posts being positioned in each said groove;
    a respective pair of holes extending through each said tongue, each said pair of holes being complementary to said pair of posts wherein each said post is inserted through an associated one of said holes when each said tongue is inserted into said associated groove; and
    a plurality of connectors, each said connector being couplable to an associated one of said posts such that said connector secures said associated post in said associated hole.

2. The device of claim 1, further comprising each said panel being coupled to an associated one of said tray segments.

3. The device of claim 1, further comprising said top wall including a slanted section, said slanted section being slanted downwardly extending inwardly away from said peripheral edge of said top wall towards said aperture.

4. The device of claim 1, further comprising a lip coupled to and extending upwardly relative to said peripheral edge of said top wall wherein said lip is configured for inhibiting material on said top wall from moving laterally off of said top wall over said peripheral edge of said top wall.

5. The device of claim 1, further comprising each said tongue being substantially tetrahedral flaring outwardly extending away from said first lateral side of said associated tray segment.

6. The device of claim 1, further comprising a plurality of rails coupled to said tray, said rails being arranged into parallel pairs defining a track extending radially from said aperture, each of said panels being positioned in an associated one of said tracks.

7. The device of claim 1, further comprising:
a plurality of slots extending through said top wall of said tray; and
a plurality of pegs, each said peg being coupled to and extending from an associated one of said panels, each said peg being positioned in and slidable in an associated one of said slots.

8. The device of claim 1, further comprising an outer portion of said top wall adjacent to said peripheral edge defining a depression positioned in said top wall.

9. The device of claim 8, further comprising a plurality of drains extending through said top wall, said drains being positioned in said depression.

10. The device of claim 1, further comprising said perimeter wall being angled relative to said top wall such that a lowermost edge of said perimeter wall is outwardly positioned relative to an uppermost edge of said perimeter wall.

11. The device of claim 1, further comprising:
a plurality of prongs, each of said prongs being coupled to an associated one of said tray segments, said prongs being arranged into two parallel pairs of linearly aligned prongs, said two parallel pairs of linearly aligned prongs being radially oriented relative to said aperture; and
each said panel having a pair of parallel slits, each said pair of linearly aligned prongs being insertable into an associated one of said slits wherein said panels are slidably engaged to said tray.

12. An expandable tree protection device comprising:
a tray comprising a top wall and a perimeter wall coupled to and extending around a peripheral edge of said top wall, said tray having an aperture extending through said top wall such that said aperture is configured for receiving a tree trunk therethrough, said perimeter wall being angled relative to said top wall such that a lowermost edge of said perimeter wall is outwardly positioned relative to an uppermost edge of said perimeter wall, said tray being defined by a plurality of separate tray segments, each said tray segment being couplable to an associated pair of adjacently positioned tray segments, said top wall including a slanted section, said slanted section being slanted downwardly extending inwardly away from said peripheral edge of said top wall towards said aperture;
a plurality of panels, each of said panels being slidably coupled to said top wall such that each said panel is freely slidable to extend into said aperture such that each said panel covers an associated portion of said aperture, a respective interior edge of each said panel being freely slidable outwardly and straight away from a center of said aperture wherein said panels are configured for expansion exposing a larger area of said aperture, each said panel being coupled to an associated one of said tray segments;
a lip coupled to and extending upwardly relative to said peripheral edge of said top wall wherein said lip is configured for inhibiting material on said top wall from moving laterally off of said top wall over said peripheral edge of said top wall;
a plurality of slots extending through said top wall of said tray;
a plurality of pegs, each said peg being coupled to and extending from an associated one of said panels, each said peg being positioned in and slidable in an associated one of said slots;
each said tray segment having a tongue extending from a first lateral side and a groove extending into a second lateral side, said tongue of each said tray segment being insertable into said groove of one of said adjacently positioned tray segments, said groove of each said tray segment receiving said tongue of one of said adjacently positioned tray segments wherein said tray segments are interlocked to form said tray, each said tongue being substantially tetrahedral flaring outwardly extending away from said first lateral side of said associated tray segment;
a respective pair of posts being positioned in each said groove;
a respective pair of holes extending through each said tongue, each said pair of holes being complementary to said pair of posts wherein each said post is inserted through an associated one of said holes when each said tongue is inserted into said associated groove;
a plurality of connectors, each said connector being couplable to an associated one of said posts such that said connector secures said associated post in said associated hole; and
a plurality of rails coupled to said tray, said rails being arranged into parallel pairs defining a track extending radially from said aperture, each of said panels being positioned in an associated one of said tracks.

* * * * *